US008474277B2

(12) United States Patent
Czechowski

(10) Patent No.: US 8,474,277 B2
(45) Date of Patent: Jul. 2, 2013

(54) COMPRESSOR WASTE HEAT DRIVEN COOLING SYSTEM

(75) Inventor: Edward S. Czechowski, Orchard Park, NY (US)

(73) Assignee: General Electric Company, Schenecady, NY (US)

( * ) Notice: Subject to any disclaimer, the term of this patent is extended or adjusted under 35 U.S.C. 154(b) by 408 days.

(21) Appl. No.: 12/835,582

(22) Filed: Jul. 13, 2010

(65) Prior Publication Data

US 2012/0011871 A1 Jan. 19, 2012

(51) Int. Cl.
*F25B 1/00* (2006.01)

(52) U.S. Cl.
USPC .......................................... 62/115; 62/238.3

(58) Field of Classification Search
USPC ................. 62/238.3, 324.4, 238.6, 335, 476, 62/115
See application file for complete search history.

(56) References Cited

U.S. PATENT DOCUMENTS

| | | | | |
|---|---|---|---|---|
| 3,015,940 | A * | 1/1962 | Harwich | 62/332 |
| 3,401,530 | A * | 9/1968 | Meckler | 62/235.1 |
| 4,285,211 | A * | 8/1981 | Clark | 62/335 |
| 4,380,909 | A * | 4/1983 | Sung | 62/79 |
| 4,471,630 | A * | 9/1984 | Sugimoto et al. | 62/175 |
| RE34,030 | E * | 8/1992 | Scherer | 62/238.3 |
| 2005/0022963 | A1 | 2/2005 | Garrabrant et al. | |
| 2006/0156761 | A1* | 7/2006 | Mola et al. | 65/333 |
| 2009/0097205 | A1* | 4/2009 | Matsushima et al. | 361/700 |

FOREIGN PATENT DOCUMENTS

| | | |
|---|---|---|
| DE | 102008006259 | 7/2008 |
| EP | 1010954 | 6/2000 |
| EP | 1591644 | 11/2005 |
| SU | 1193390 | 11/1985 |

* cited by examiner

*Primary Examiner* — Mohammad M Ali
(74) *Attorney, Agent, or Firm* — Fletcher Yoder, P.C.

(57) ABSTRACT

Provided in some embodiments is a system that includes a gas compressor including an engine, a compressor driven by the engine, and a vapor absorption cycle (VAC) system driven by waste heat from the compressor, wherein the VAC system is configured to cool at least one medium. In other embodiments is provided a method that includes generating waste heat while compressing a gas, driving a vapor absorption cycle (VAC) system with the waste heat, and cooling at least one medium via the VAC system.

24 Claims, 5 Drawing Sheets

COMPRESSOR WASTE HEAT DRIVEN COOLING SYSTEM

FIELD OF THE INVENTION

This invention relates to gas compressors. More particularly, the present invention relates to a gas compressor employing a cooling system driven by compressor waste heat.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Gas compressors are used in a wide variety of industries including aerospace, automotive, oil and gas, power generation, food and beverage, pharmaceuticals, water treatment, and the like. The gas may include air, nitrogen, oxygen, natural gas, or any other type of gas. Gas compressors generally include devices that increase the pressure of a gas by decreasing (e.g., compressing) its volume. During the compression of gas, heat energy is developed as a byproduct. Unfortunately, this heat energy is generally expelled as wasted heat energy. Thus, the wasted heat energy represents a significant efficiency loss in the gas compressors.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments discussed below include a system and method that addresses one or more of the above-mentioned inadequacies of a conventional compressor system. In certain embodiments, a system includes an engine, a compressor driven by the engine, and a vapor absorption cycle (VAC) system driven by waste heat from the compressor. In some embodiments, the compressor includes a single compression stage, while in other embodiments the compressor includes multiple compression stages. In certain embodiments, multiple compression stages generate waste heat to drive a single VAC system. In other embodiments with multiple compression stages and multiple VAC systems, each compression stage generates waste heat to drive a separate VAC system. The VAC system is configured to cool at least one medium. For example, in some embodiments the cooled media includes components of the compressor system, electronics, building spaces, or fluids. Before discussing embodiments of the present technique and system, it may be beneficial to describe a compressor system that may employ such a system.

Figure 1:
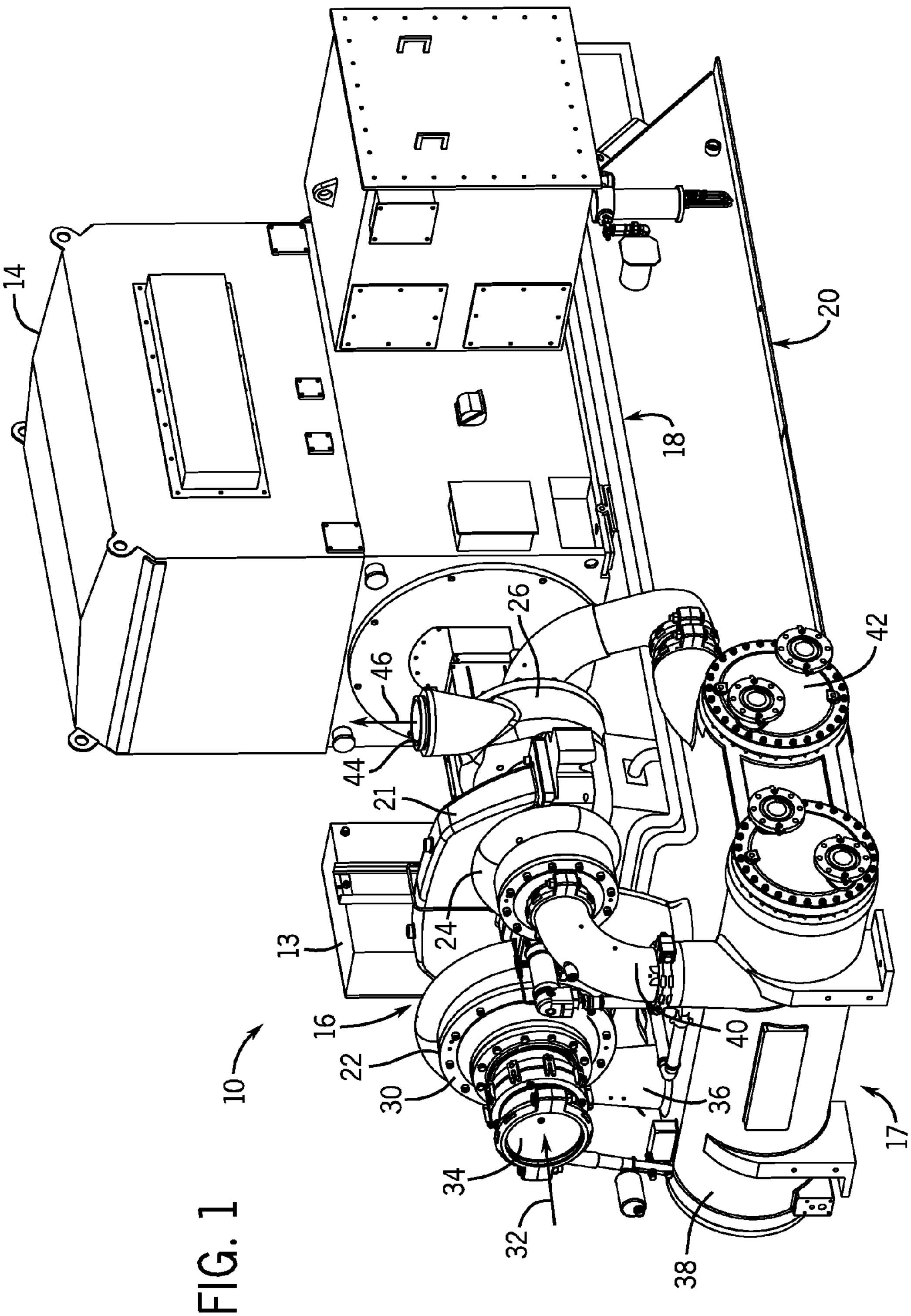
FIG. 1 is a perspective view of an exemplary compressor system having a vapor absorption cycle system driven by waste compressor heat in accordance with an embodiment of the present technique.

FIG. 1 illustrates an embodiment of a compressor system 10 employing a VAC system 48 (see FIG. 2) driven by waste compressor heat in accordance with aspects of the present technique. The compressor system 10 is generally configured to compress gas in various applications. For example, the compressor system 10 may be employed in applications relating to the automotive industries, electronics industries, aerospace industries, oil and gas industries, power generation industries, petrochemical industries, and the like.

Generally the compressor system 10 includes one or more of a reciprocating, rotary, axial, and/or a centrifugal gas compressor that is configured to increase the pressure of (e.g., compress) incoming gas. In the illustrated embodiment, the compressor system 10 includes a centrifugal compressor. More specifically, the depicted embodiment includes a Turbo-Air 9000 manufactured by Cameron of Houston, Tex. In some embodiments, the compressor system 10 includes a power rating of approximately 150 to approximately 3,000 horsepower (HP), discharge pressures of approximately 80 to 150 pounds per square inch (PSIG) and an output capacity of approximately 600 to 15,000 cubic feet per minute (CFM). It will be appreciated that, although, the illustrated embodiment includes only one of many compressor arrangements that can employ the VAC system 48, other embodiments of the compressor system 10 may include various compressor arrangements and operational parameters. For instance, the compressor system 10 may include a different type of compressor (e.g., a smaller, portable compressor), a lower horsepower rating suitable for applications having a lower output capacity and/or lower pressure differentials, a higher horsepower rating suitable for applications having a higher output capacity and/or higher pressure differentials, and so forth.

In the illustrated embodiment, the compressor system 10 includes a control panel 13, a drive unit 14, a compressor unit 16, an intercooler 17, a lubrication system 18, and a common base 20. The common base 20 generally provides for simplified assembly and installation of the compressor system 10.

For example, the control panel 13, the drive unit 14, the compressor unit 16, intercooler 17, and the lubrication system 18 are coupled to the common base 20. This enables installation and assembly of the compressor system 10 as modular components that are pre-assembled and/or assembled on site.

The control panel 13 typically includes various devices and controls configured to monitor and regulate operation of the compressor system 10. For example, in one embodiment, the control panel 13 includes a switch to control system power, and/or numerous devices (e.g., liquid crystal displays and/or light emitting diodes) indicative of operating parameters of the compressor system 10. In other embodiments, the control panel 13 includes advanced functionality, such as a programmable logic controller (PLC) or the like.

The drive unit 14 generally includes a device configured to provide motive power to the compressor system 10. The drive unit 14 is employed to provide energy, typically in the form of a rotating drive unit shaft, which is used to compress the incoming gas. Generally, the rotating drive unit shaft is coupled to the inner workings of the compressor unit 16, and rotation of the drive unit shaft is translated into rotation of an impeller that compresses the incoming gas. In the illustrated embodiment, the drive unit 14 includes an electric motor that is configured to provide rotational torque to the drive unit shaft. In other embodiments, the drive unit 14 may include other motive devices, such as a compression ignition (e.g., diesel) engine, a spark ignition (e.g., internal gas combustion) engine, a gas turbine engine, a steam turbine, a hydro turbine, a wind turbine, or the like.

The compressor unit 16 includes a gearbox 21 that is coupled to the drive unit shaft. The gearbox 21 generally includes various mechanisms that are employed to distribute the motive power from the drive unit 14 (e.g., rotation of the drive unit shaft) to impellers of the compressor stages. For instance, in operation of the system 10, rotation of the drive unit shaft is delivered via internal gearing to the various impellers of a first compressor stage 22, a second compressor stage 24, and a third compressor stage 26. In the illustrated embodiment, the internal gearing of the gear box 21 typically includes a bull gear coupled to a drive shaft that delivers rotational torque to the impeller.

It will be appreciated that such a system (e.g., where a drive unit 14 that is indirectly coupled to the drive shaft that delivers rotational torque to the impeller) is generally referred to as an indirect drive system. In certain embodiments, the indirect drive system may include one or more gears (e.g., gearbox 21), a clutch, a transmission, a belt drive (e.g., belt and pulleys), or any other indirect coupling technique. However, another embodiment of the compressor system 10, although not illustrated here, may include a direct drive system. In an embodiment employing the direct drive system, the gear box 21 and the drive unit 14 are essentially integrated into the compressor unit 16 to provide torque directly to the drive shaft. For example, in a direct drive system, a motive device (e.g., an electric motor) surrounds the drive shaft, thereby directly (e.g., without intermediate gearing) imparting a torque on the drive shaft. Accordingly, in an embodiment employing the direct drive system, multiple electric motors can be employed to drive one or more drive shafts and impellers in each stage of the compressor unit 16.

In FIG. 1, the gearbox 21 includes features that provide for increased reliability and simplified maintenance of the system 10. For example, the gearbox 21 includes an integrally cast multi-stage design for enhanced performance. In other words, the gearbox 21 includes a singe casting including all three scrolls helping to reduce the assembly and maintenance concerns typically associated with systems 10. Further, the gearbox 21 includes a horizontally split cover for easy removal and inspection of components disposed internal to the gearbox 21.

As discussed briefly above, the compressor unit 16 generally includes one or more stages that compress the incoming gas in series. For example, in the illustrated embodiment, the compressor unit 16 includes three compression stages (e.g., a three stage compressor), including the first stage compressor 22, the second stage compressor 24, and the third stage compressor 26. Each of the compressor stages 22, 24, and 26 includes a centrifugal scroll that includes a housing encompassing one or more gas impellers. In operation, incoming gas is sequentially passed into each of the compressor stages 22, 24, and 26 before being discharged at an elevated pressure.

Operation of the system 10 includes drawing a gas into the first stage compressor 22 via a compressor intake 30 and in the direction of arrow 32. As illustrated, the compressor unit 16 also includes a guide vane 34. The guide vane 34 includes vanes and other mechanisms to direct the flow of the gas as it enters the first compressor stage 22. For example, the guide vane 34 typically imparts a whirling motion to the intake air flow in the same direction as the impeller of the first compressor stage 22, thereby helping to reduce the work input at the impeller to compress the incoming gas.

After the gas is drawn into the system 10 via the compressor intake 30, the first stage compressor 22 compresses and discharges the compressed gas via a first duct 36. The first duct 36 routes the compressed gas into a first stage 38 of the intercooler 17. The compressed gas expelled from the first compressor stage 22 is directed through the first stage intercooler 38 and is discharged from the intercooler 17 via a second duct 40.

Generally, each stage of the intercooler 17 includes a heat exchange system to cool the compressed gas. An intercooler stage is typically provided after each compressor stage (e.g., 22, 24, and 26) to reduce the gas temperature and/or to improve the efficiency of each subsequent compression stage. For example, in the illustrated embodiment, the second duct 40 routes the compressed gas into the second compressor stage 24 and a second stage 42 of the intercooler 17 before routing the gas to the third compressor stage 26.

After the third stage compresses the gas, the compressed gas is discharged via a compressor discharge 44 in the direction of arrow 46. In the illustrated embodiment, the compressed gas is routed from the third stage compressor 26 to the discharge 44 without an intermediate cooling step (e.g., passing through a third intercooler stage). However, other embodiments of the compressor system 10 may include a third stage of the intercooler 17 configured to cool the compressed gas as it exits the third compressor stage 26. Further, additional ducts may be coupled to the discharge 44 to effectively route the compressed gas for use in a desired application (e.g., drying applications).

In the illustrated embodiment, the intercooler 17 comprises, or is part of, a vapor absorption cycle (VAC) system to cool a fluid (e.g., liquid or gas). In particular, the VAC system uses the heat energy from each compression stage to drive a cooling system. In one embodiment, each intercooler 17 stage provides the waste compressor heat to a single common VAC system. In another embodiment, each intercooler 17 stage provides the waste compressor heat to an independent VAC system. In turn, the cooling provided by the one or more VAC systems may be used to cool a variety of fluids. For example, the VAC cooling may be used for air conditioning, cooling electronics, cooling lubricants (e.g., oil), cooling water, drying air, and so forth.

Figure 2:
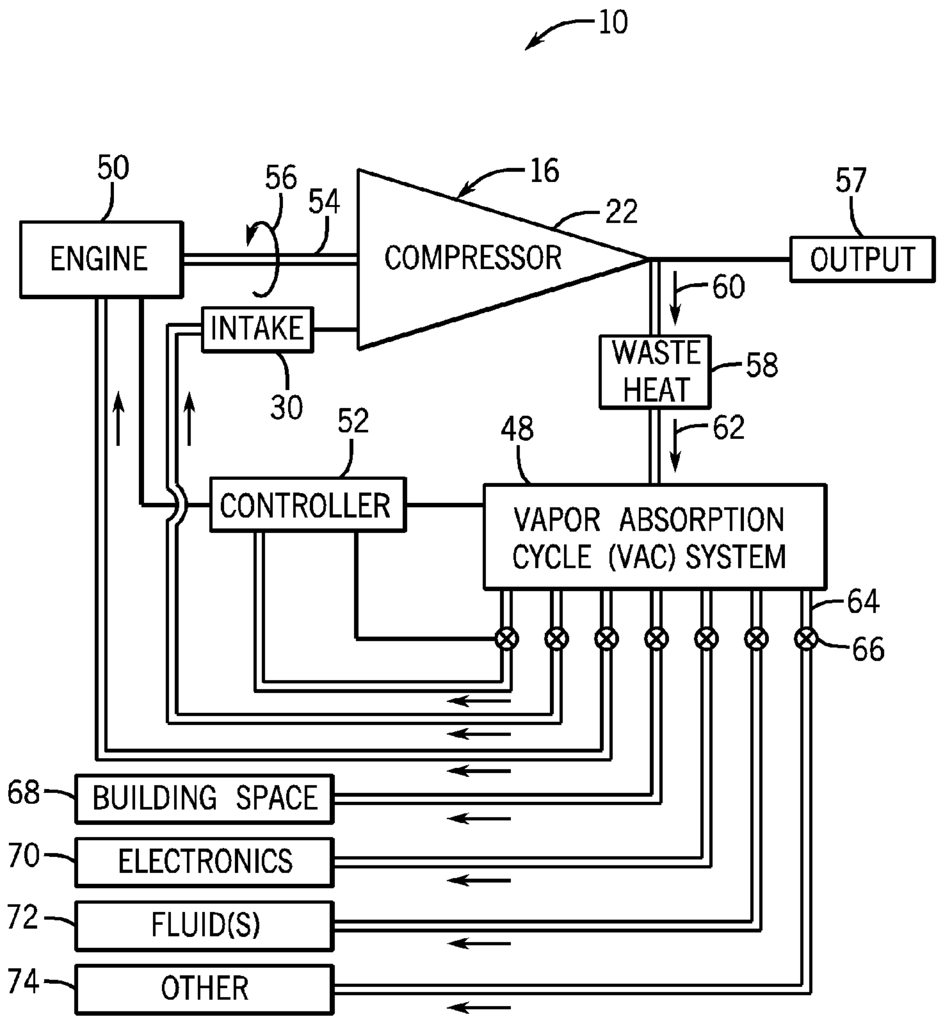
FIG. 2 is a schematic diagram of an embodiment of a compressor system with a single compressor stage and a vapor absorption cycle system driven by waste compressor heat.

FIG. 2 illustrates an embodiment of the compressor system 10 with the single compressor stage 22 and VAC system 48. The compressor system 10 includes an engine 50, compressor unit 16, intake 30, controller 52, and VAC system 48. The engine 50 provides rotational torque to a shaft 54 to rotate the shaft 54 in a rotational direction indicated by arrow 56. The engine 50, as mentioned above, may include compression ignition (e.g., diesel) engine, spark ignition (e.g., internal gas combustion) engine, gas turbine engine, or other type of engine. The shaft 54 is coupled to the inner workings of the compressor unit 16. The compressor unit 16 includes the single compressor stage 22 that houses one or more impellers. As gas enters the compressor unit 16 through intake 30, the rotation of shaft 54 drives the rotation of the impeller which compresses the gas. The compressed gas is discharged at an elevated pressure as output 57 for subsequent use to harness the energy of the compressed gas.

During the compression of the gas, the temperature of the gas increases producing heat 58 as a byproduct. The waste heat 58 may be removed from the compressor via intercooler 17 or some other heat exchanger as indicated by arrow 60. This waste heat 58 is diverted to the VAC system 48 as indicated by arrow 62. The VAC system 48 may use the waste heat 58, as described in more detail in FIG. 5, to drive the operation of the VAC system 48 to generate a cooling output. The cooling output is diverted to one or more media through conduits 64 with valves 66 to control the flow of the cooling output through the conduits 64. The VAC system 48, as well as the valves 66 of the conduits 64, are regulated by the controller 52. The controller 52 may be located within the control panel 13 or within another location of the compression system 10. The controller 52 may regulate the percentage of the cooling output to be diverted to each media based on the cooling needs of the media. The controller 52 may selectively open and close the valves 66 to enable only one flow of cooling output to a single media, or multiple flows of cooling output to multiple media. The controller 52 also regulates the engine 50 of the compression system 10.

The cooling output of the VAC system 48 may be used to cool components of the compression system 10 such as the engine 50, the gas intake 30, the controller 52, or the control panel 13. The VAC system's cooling output may also be used to cool a building space 68, electrical equipment or electronics 70, or one or more fluids 72. The building space 68 may include dedicated rooms for power distribution centers, control centers, storage, and any other function. The electrical equipment or electronics 70 may include compressor electronics, external electronics, robotics, automation equipment, machinery, and any other equipment. The fluid 72 may include a liquid, gas, or a combination thereof. Examples of liquids include water (e.g., present in the intercooler 17 or other cooling system), liquid nitrogen, gasoline, ionic liquids, lubricants (e.g., oil), coolant (e.g., liquids), and any other liquids. Examples of gases include air, inert gases (e.g., nitrogen or helium), natural gas (e.g., methane or propane), oxygen, carbon dioxide, ammonia, and any other gases or gas mixtures. The cooling output may be used for other media or applications 74, such as air dryers, water chillers, and air pre-coolers, as well as, other applications. Thus, the cooling output may be used solely for cooling components of the compression system 10 as well as systems or spaces external to the compression system 10. In addition, the compressor system 10 may be portable and include an output (e.g., quick release port) to provide cooled air for any desired use; thus, the portable unit allows the user to select the cooling application.

Figure 3:
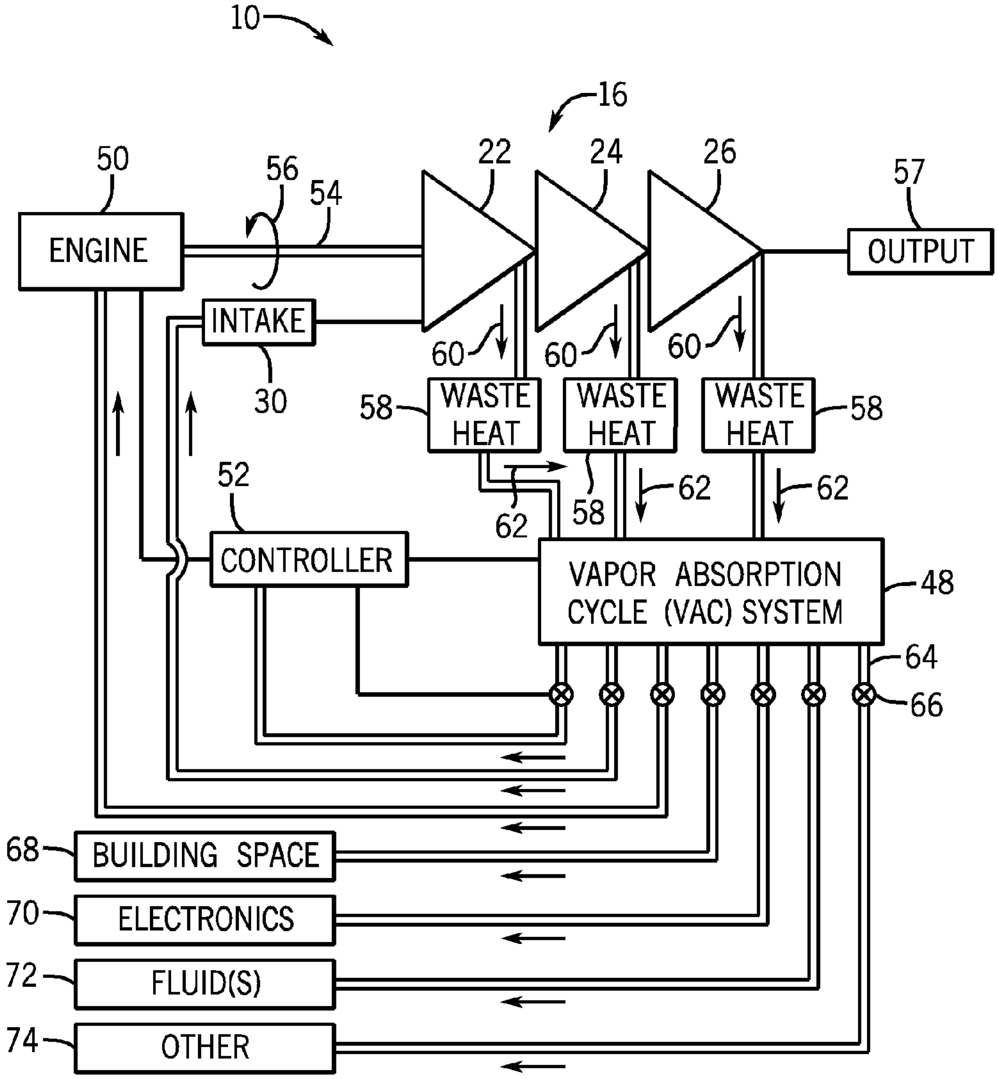
FIG. 3 is a schematic diagram of an embodiment of a compressor system with multiple compressor stages and a vapor absorption cycle system driven by waste compressor heat.

FIG. 3 illustrates an embodiment of the compressor system 10 with multiple compressor stages 22, 24, and 26, and the VAC system 48 driven by waste compressor heat. The illustrated compressor system 10, similar to the embodiment in FIG. 2, includes engine 50, compressor unit 16, compressor intake 30, controller 52, and VAC system 48. The compressor unit 16 includes three compression stages, including the first stage compressor 22, the second stage compressor 24, and the third stage compressor 26. Although the embodiment illustrates three compression stages, the compressor unit 16 may include any number of compressions stages (e.g., 2 to 10 or more). Each compressor stage 22, 24, and 26 houses one or more impellers. As described above, gas enters the compressor unit 16 via the intake 30. The engine 50 drives the rotation, as indicated by arrow 56, of the shaft 54. In turn, the shaft 54 drives the rotation of the impellers within compressor stages 22, 24, and 26 which compresses the gas. As mentioned above, the compressed gas is discharged at an elevated pressure as output 57 for subsequent use.

During the compression of the gas at each compressor stage 22, 24, and 26, waste heat 58 is generated as a byproduct, which may be removed via the intercooler 17 or some other heat exchanger as indicated by arrows 60. The intercooler 17 may include multiple intercooler stages with an intercooler stage specifically associated with each compressor stage 22, 24, and 26. In certain embodiments, the first compressor stage 22 generates approximately 30 to 70 percent of the waste heat 58, the second compressor stage 24 generates approximately 25 to 45 percent of the waste heat 58, and the third compressor stage 26 generates approximately 15 to 35 percent of the waste heat 58. This waste heat 58 collected from all three compressor stages 22, 24, and 26 is diverted to VAC system 48 as indicated by arrows 62. In some embodiments, the waste heat 58 may only be recovered from one or two of the compressor stages 22, 24, and 26. In other embodiments, the compressor stage 22, 24, or 26, or any combination thereof, used to supply waste heat 58 to the VAC system 48 may be altered on a continuous basis. Such alteration may occur via the controller 52, which regulates both the VAC system 48 and the engine 50, or some other mechanism. As mentioned above, the VAC system 48 may use the waste heat 58 to drive the operation of the system 48 to generate a cooling output. The cooling output is then diverted to one or more media, as described above, through conduits 64. Also, as described above, the controller 52 may regulate the diversion of the cooling output to the various media.

Figure 4:
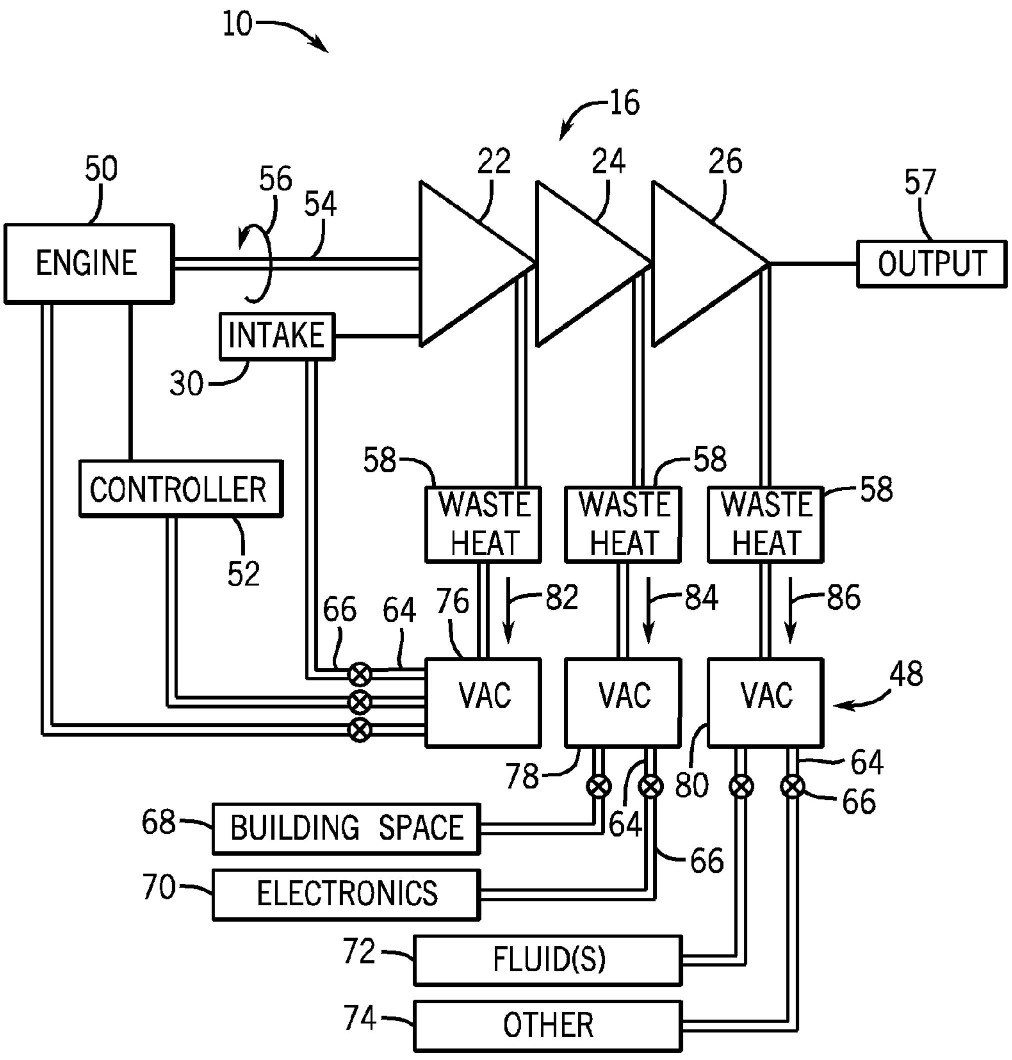
FIG. 4 is a schematic diagram of an embodiment of a compressor system with multiple compressor stages and multiple vapor absorption cycle systems driven by waste compressor heat.

FIG. 4 illustrates an embodiment of the compressor system 10 with multiple compressor stages 22, 24, and 26, and multiple VAC systems 48 driven by waste compressor heat 58. The illustrated compressor system 10, similar to the embodiment in FIG. 3, includes engine 50, compressor unit 16, compressor intake 30, and controller 52. The compressor unit 16 includes three compression stages, including the first stage compressor 22, the second stage compressor 24, and the third stage compressor 26. Each compressor stage 22, 24, and 26 houses one or more impellers. The compressor system 10 also includes multiple VAC systems 48, including a first VAC system 76, a second VAC system 78, and a third VAC system 80. Although the embodiment illustrates three VAC systems 48, the compressor system 10 may include any number of VAC systems 48, e.g., 2 to 10 or more. As described above, gas enters the compressor unit 16 via the intake 30. The engine 50 drives the rotation, as indicated by arrow 56, of the shaft 54. In turn, the shaft 54 drives the rotation of the impellers within compressor stages 22, 24, and 26 which compresses the gas. As mentioned above, the compressed gas is discharged at an elevated pressure as output 57 for subsequent use.

During the compression of the gas at each compressor stage 22, 24, and 26, waste heat 58 is generated as a byproduct, which may be removed via the intercooler 17 or some other heat exchanger. As noted above, the intercooler 17 may include multiple intercooler stages with an intercooler stage specifically associated with each compressor stage 22, 24, and 26. More specifically, waste heat 58 generated from the first compressor stage 22 is diverted to the first VAC system 76 to drive the operation of system 76 to generate a cooling output. The cooling output from the first VAC system 76 may be used to cool components of the compression system 10. For example, the first VAC system 76 may be connected via conduits 64, with valves 66 to control the flow of the cooling output, to the engine 50, the controller 52, the intake 30, or control panel 13. More specifically, if the engine 50 is a combustion engine, the cooled engine components may include engine coolant (e.g., water), engine lubricant (e.g., oil), engine control unit, and any other engine component. If the engine 50 is an electric engine, then cooled engine components may include coils and any other engine component.

Also, waste heat 58 generated from the second compressor stage 24 is diverted to the second VAC system 78 to drive operation of system 78 to generate a cooling output. The cooling output from the second VAC system 78, delivered via conduits 64, may be used to cool a building space 68 or electronic equipment or electronics 70. The building space 68 may include storage space, server room, power distribution room, and any other room or space.

Further, waste heat 58 generated from the third compressor stage 26 is diverted to the third VAC system 80 to drive operation of system 80 to generate a cooling output. The cooling output from the third VAC system 80, delivered via conduits 64, may be used to cool one or more fluids 72 as described above. The fluid 72 may include a liquid, gas, or a combination thereof. Examples of liquids include water (e.g., present in the intercooler 17 or other cooling system), liquid nitrogen, gasoline, ionic liquids, lubricants (e.g., oil), coolant (e.g., liquids), and any other liquids. Examples of gases include air, inert gases (e.g., nitrogen or helium), natural gas (e.g., methane or propane), oxygen, carbon dioxide, ammonia, and any other gases or gas mixtures. The cooling output from the third VAC system 80 may also be used to cool other media or applications 74, such as air dryers, water chillers, and air pre-coolers, as well as, other applications.

As described above, the controller 52 may regulate the diversion of the cooling outputs to the various media. As illustrated, the multiple VAC systems 48 (e.g., 76, 78 and 80) provide independent supplies of cooling output, which may be used alone or in combination with one another to cool various spaces, fluids, machinery, electronics, and applications in a facility. Thus, the independent VAC system 48 as well as the valves 66 and conduits 64 enable a wide range of cooling to be provided by the waste heat 58. For example, the controller 52 may control the flow of waste heat 58 to each VAC system 48 and the cooling output from each VAC system 48 in response to cooling demands of the various applications. Furthermore, the medium or media connected to each VAC system 48 may vary. For example, the different VAC systems 48 may cool gases (e.g., air or nitrogen) and liquids (e.g., oil, water, or coolant liquids), which then may be used to cool other systems. Also, in some embodiments, each compressor stage may not be associated with an individual VAC system 48, but may be associated with multiple VAC systems 48 or no VAC systems 48. Alternatively, multiple compressor stages may be associated with one of the VAC systems 48, while a single compressor stage may be associated with the other VAC systems 48.

Figure 5:
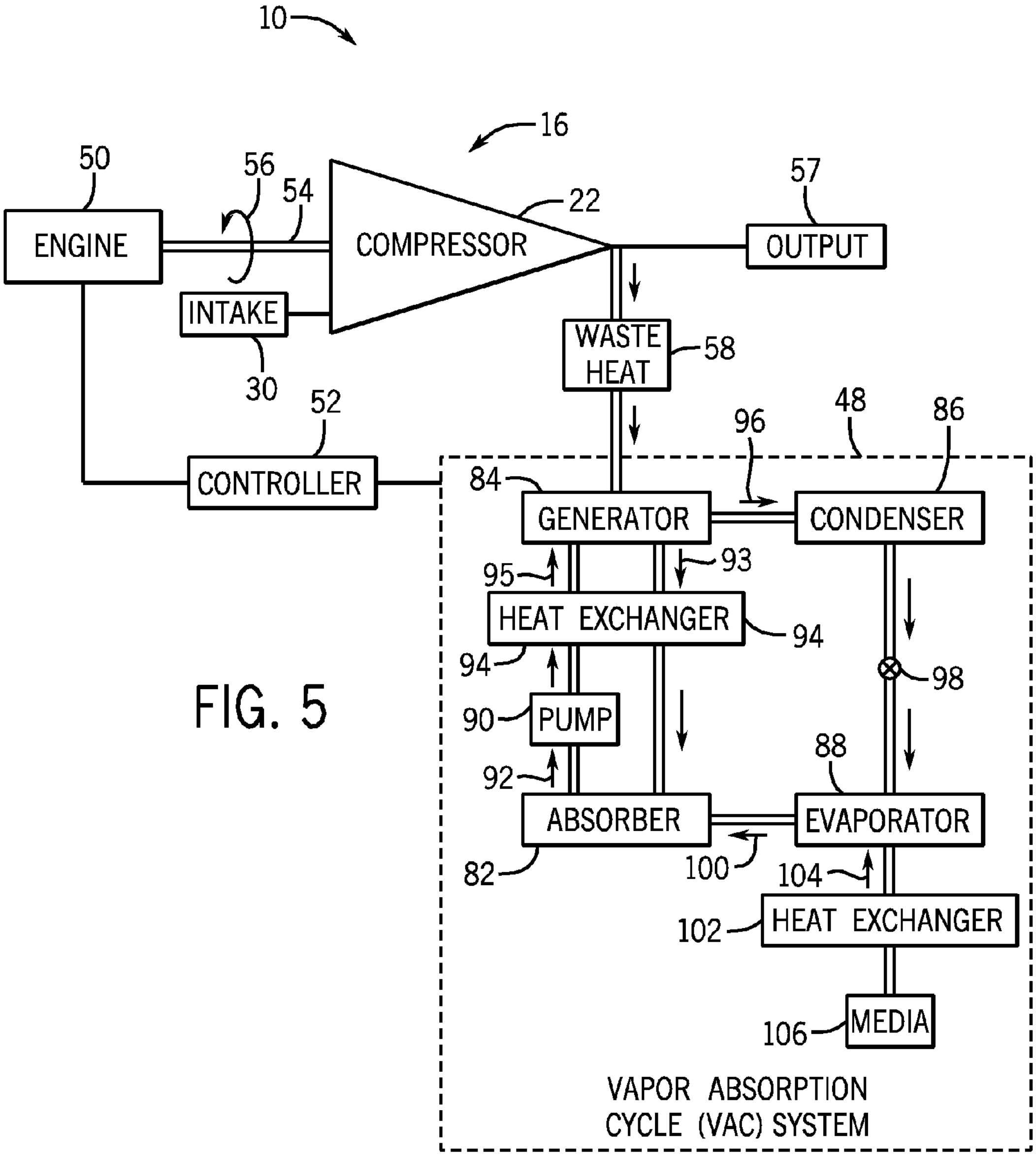
FIG. 5 is a schematic diagram of an embodiment of the vapor absorption cycle system in the compressor system of FIG. 2.

FIG. 5 illustrates an embodiment of the compression system 10 with the VAC system 48, illustrating a detailed embodiment of the VAC system 48. The compression system 10 includes engine 50, compressor stage 22, compressor intake 30, controller 52, and VAC system 48. The engine 50 drives the rotation of the shaft 54 as indicated by arrow 56. As gas enters the compressor intake 30, the one or more impellers located within compressor stage 22 are rotated by the shaft 54 to compress the gas. The compressed gas is then discharged as output 56 for further use. Waste heat 58 generated as a byproduct from compressor stage 22 may be harvested by intercooler 17 or some other heat exchanger and used by the VAC system 48. The VAC system 48 and engine may regulated by the controller 52 as previously described.

The VAC system 48 includes an absorber 82, a generator 84, a condenser 86, and an evaporator 88. The absorber 82 includes water which acts as an absorbent. A refrigerant (e.g., ammonia) in vapor form, with a high affinity to dissolve in water, is mixed with and dissolved in the water. Cooling water may be circulated around the absorber 82 to maintain a low temperature and increase the amount of refrigerant dissolved in the water. The rich mixture of water and refrigerant is directed to a pump 90, as indicated by arrow 92, to increase the pressure of the mixture. From the pump 90, the rich mixture may pass through a heat exchanger 94 prior to reaching the generator 84. In the heat exchanger 94, heat from a weak mixture of refrigerant and water returning from the generator 84 to the absorber 82 may be transferred to the rich mixture entering the generator 84. The generator 84 uses the waste heat 58 harvested from the compressor stage 22. The waste heat 58 acts as a heat source to increase the temperature of the mixture of refrigerant and water. At high temperature and high pressure, the refrigerant leaves as a vapor from the rich mixture, as indicated by arrow 96, leaving the weak mixture of refrigerant and water. The remaining weak mixture, as indicated by arrow 93, is transferred back to the absorber 82 to dissolve more refrigerant. On the way to the absorber 82, the weak mixture 93 may pass through a heat exchanger 94, as mentioned above, to transfer heat to the rich mixture, indicated by arrow 95, entering the generator 84.

The high temperature, high pressure refrigerant vapor 96 then passes to the condenser 86. In the condenser 86, both the temperature and the pressure of the refrigerant vapor are reduced to condense the refrigerant into a liquid state. The liquid refrigerant passes through an expansion valve 98 forming a low pressure, low temperature refrigerant liquid-vapor mixture. The refrigerant liquid-vapor mixture is directed to the evaporator 88. Upon entering the evaporator 88, the cooling output is generated. In particular, heat is transferred from a substance to be cooled to boil the refrigerant liquid-vapor mixture at a low temperature. The boiling of the mixture results in a low-pressure refrigerant vapor that is transferred to the absorber 82, as indicated by arrow 100 to repeat the process again. The evaporator 88 may include a heat exchanger 102 to facilitate the transfer of heat, indicated by arrow 104, to the refrigerant and the diversion of the cooling output to the medium or media 106 to be cooled. For example, ambient air may pass through the heat exchanger and be cooled and then diverted to the medium to be cooled.

The arrangement of the VAC system 48 described above may vary in other embodiments. For example, in embodiments using ammonia as a refrigerant, a rectifier may exist between the generator 84 and the condenser 86 to eliminate any water from the ammonia. Also, while water may act as the absorbent and ammonia as the refrigerant, in other embodiments water may act as the refrigerant and lithium bromide as the absorbent.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:

an engine;

a compressor driven by the engine; and a vapor absorption cycle (VAC) system configured to vaporize a coolant from an absorbent using waste heat from the compressor, wherein the VAC system is configured to cool at least one medium.

2. The system of claim 1, wherein the compressor comprises a plurality of compression stages, and the VAC system is driven by waste heat from at least one of the plurality of compression stages.

3. The system of claim 2, wherein the VAC system comprises a first VAC system driven by waste heat from a first compression stage, and a second VAC system driven by waste heat from a second compression stage.

4. The system of claim 3, wherein the VAC system comprises a third VAC system driven by waste heat from a third compression stage.

5. The system of claim 2, wherein the VAC system is driven by waste heat from the plurality of compression stages.

6. The system of claim 1, wherein the VAC system is configured to cool a gas intake of the compressor.

7. The system of claim 1, wherein the VAC system is configured to cool a controller.

8. The system of claim 1, wherein the VAC system is configured to cool water.

9. The system of claim 1, wherein the VAC system is configured to cool the engine.

10. A system, comprising:

a compressor comprising a plurality of compression stages configured to progressively compress a gas; and a vapor absorption cycle (VAC) system configured to vaporize a coolant from an absorbent using heat generated during compression of the gas by at least one of the plurality of compression stages, wherein the VAC system is configured to cool at least one medium.

11. The system of claim 10, wherein the VAC system comprises a first VAC system driven by heat generated during compression of the gas by a first compression stage, and a second VAC system driven by heat generated during compression of the gas by a second compression stage.

12. The system of claim 11, wherein the VAC system comprises a third VAC system driven by heat generated during compression of the gas by a third compression stage.

13. The system of claim 10, wherein the VAC system is driven by heat generated during compression of the gas by the plurality of compression stages.

14. The system of claim 10, wherein the VAC system is configured to cool a gas intake of the compressor.

15. The system of claim 10, wherein the VAC system is configured to cool electronics.

16. The system of claim 10, wherein the VAC system is configured to cool at least one fluid.

17. The system of claim 1, wherein the VAC system is configured to vaporize the coolant from the absorbent in a mixture circulating through an absorber to produce a first vaporized coolant, the VAC system is configured to route the first vaporized coolant to a condenser to produce a condensed coolant, the VAC system is configured to route the condensed coolant to an evaporator to produce a second vaporized coolant, and the VAC system is configured to route the second vaporized coolant to the absorber to be absorbed by the absorbent.

18. The system of claim 10, wherein the VAC system is configured to vaporize the coolant from the absorbent in a mixture circulating through an absorber to produce a first vaporized coolant, the VAC system is configured to route the first vaporized coolant to a condenser to produce a condensed coolant, the VAC system is configured to route the condensed coolant to an evaporator to produce a second vaporized coolant, and the VAC system is configured to route the second vaporized coolant to the absorber to be absorbed by the absorbent.

19. A method, comprising:

generating waste heat from a compressor while compressing a gas;

vaporizing a coolant from an absorbent in a vapor absorption cycle (VAC) system with the waste heat; and cooling at least one medium via the VAC system.

20. The method of claim 19, wherein generating waste heat comprises generating waste heat from a plurality of compression stages of the compressor.

21. The method of claim 19, wherein vaporizing the coolant from the absorbent in the VAC system with the waste heat comprises driving a first VAC system with waste heat from a first compression stage, and driving a second VAC system by waste heat from a second compression stage.

22. The method of claim 19, wherein cooling the at least one medium comprises cooling a plurality of different media.

23. A system, comprising:

a compressor comprising first and second compression stages configured to progressively compress a gas; and a vapor absorption cycle (VAC) system comprising a first VAC system driven by heat generated during compression of the gas by the first compression stage and a second VAC system driven by heat generated during compression of the gas by the second compression stage.

24. A method, comprising:

generating waste heat while compressing a gas in first and second compression stages;

driving a first vapor absorption cycle (VAC) system with the waste heat from the first compression stage;

driving a second vapor absorption cycle (VAC) system with the waste heat from the second compression stage; and cooling at least one medium via the first or second VAC system.

* * * * *